G. DE VIGNE.
VALVE FOR PNEUMATIC TIRES.
APPLICATION FILED MAY 25, 1908.
928,411.
Patented July 20, 1909.
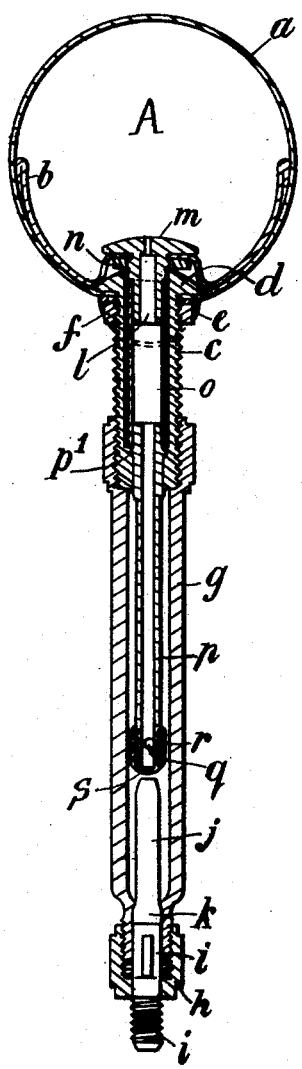
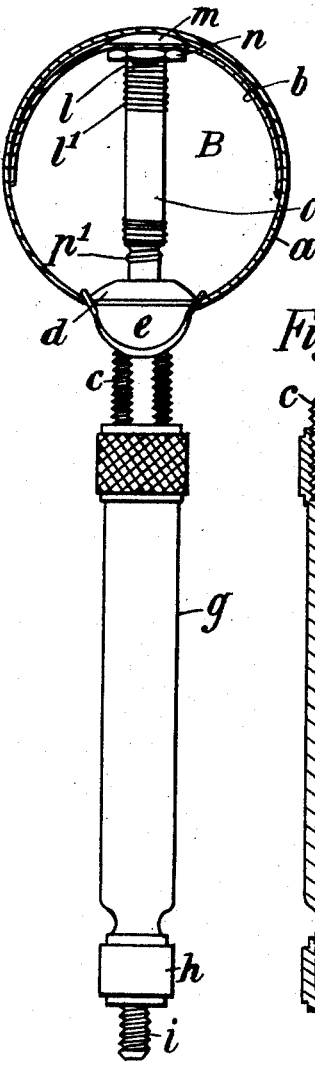
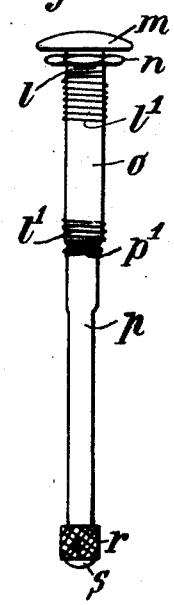

UNITED STATES PATENT OFFICE.

GRACE DE VIGNE, OF CHELTENHAM, ENGLAND.

VALVE FOR PNEUMATIC TIRES.

No. 928,411.   Specification of Letters Patent.   Patented July 20, 1909.

Application filed May 25, 1908. Serial No. 434,927.

*To all whom it may concern:*

Be it known that I, GRACE DE VIGNE, née PARKINSON, a subject of the King of Great Britain, residing at Cheltenham, in the county of Gloucester, England, have invented a new and useful Valve for Pneumatic Tires, of which the following is a specification.

The object of the present invention is to construct an improved valve for separately inflating the air chambers of a duplex air tube for pneumatic tires in which only one non-return valve is used.

The invention is illustrated in the accompanying drawings in which—

Figure 1 is a longitudinal section of the improved valve attached to a duplex air tube and Fig. 2 is an exterior view of the valve showing it attached to a duplex air tube which latter is shown in section. Fig. 3 is a longitudinal section of the lower part of the valve showing a modification. Fig. 4 is an elevation of some parts shown separately.

The duplex air tube consists of an exterior portion $a$ with an interior portion $b$ which is attached to the sides of the exterior portion $a$ as shown more clearly in Fig. 1. The portion $b$ may rest against the inner side of the air tube $a$ as shown in Fig. 1 and form an air chamber A which is first inflated and used as an ordinary air tube. When such tube becomes punctured the lower part of the air tube is inflated and thus an air chamber B is formed as shown at Fig. 2. Such air tubes are already known and form no part of the present invention.

According to the present invention I attach a valve casing $c$ to the tube $a$. Such casing has the usual head $d$, washer or seating $e$ and nut $f$ which screws on the exterior of the casing $c$. On the end of this casing $c$ is screwed a tubular extension $g$ which is common in this type of duplex valve and which is screw threaded at its lower end to receive a cap $h$ which retains the valve stem $i$ in position. The valve stem is of the usual construction having a central aperture $i'$ and lateral exit $i^2$ and is provided with the usual rubber tube $j$ which closes the said lateral exit in the valve stem and the expanded end $k$ of the rubber tube $j$ is pressed tightly against the seating in the extension $g$ by the usual cap $h$.

The interior portion $b$ of the air tube is provided with a metal air inlet $l$ which is passed through said interior portion $b$, and said inlet $l$ has a head $m$ and is screw threaded on its exterior to receive a nut $n$, by which means the inlet $l$ is secured in an air-tight manner in the part $b$. To the lower part of the air inlet $l$ is secured by binding wire or cord $l'$ an india rubber tube $o$, to which no separate claim is made, and to the lower part of the tube $o$ is secured also by binding wire or cord $l'$ a metal continuation $p$ which has a single or very short screw thread $p'$ at its upper end and may be screwed into the lower part of the casing $c$. The continuation $p$ is provided at its lower end with means for closing the same and such closing means are of such a nature that a free air passage may be left when desired.

In the drawing I have shown a hole $q$ in the end of the tube P, which hole is closed by a screwed sleeve $r$ formed with a hole so that when the sleeve is in one position the two holes are coincident but when the sleeve is rotated a quarter turn a solid portion of the sleeve covers the hole $q$. The metal continuation is preferably formed with a slight head $s$ so that the sleeve $r$ cannot be removed. Such continuation $p$ may be closed by other suitable means such as an ordinary screw cap but the objection to such a closing means is that the cap may be lost.

The action of the valve is as follows:—
When the parts are in the position shown at Fig. 1 air may pass into the central aperture $i'$ of the valve stem $i$ and out through its lateral exit $i^2$, raising the rubber valve tube $j$ and entering the continuation $p$ through the hole $q$. The air then passes direct into the air chamber A. When the tube thus inflated becomes punctured the part $g$ is unscrewed from the casing $c$. The part $p$ is then closed at its lower end by rotating the sleeve $r$, see Fig. 1, or by screwing on a loose cap as shown in Fig. 3. The part $p$ is then screwed into the casing $c$ and when it has been screwed right through the same it is pushed still farther into the casing $c$. The part $g$ is then again screwed onto the casing $c$ and air is pumped through the valve stem $i$. The air then passes around the outside of the part $p$ and finds its way up through the casing $c$ into the chamber B thus raising the head $m$ into the position shown in Fig. 2. The tube $o$, being made of rubber as is usual in this type of duplex valve, enables the air tube to be depressed when that part of the tire close to the head $m$ comes into contact with the ground.

It will be understood that the head $m$ of the air inlet $l$ may be inserted through the hole cut in the part $a$ to receive the valve casing $c$ and the head $m$ may then be placed in position in the part $b$. The nut $n$ may also be inserted through the hole cut in the part $a$ to receive the valve casing $c$. The valve casing $c$ is inserted in the part $a$ in the usual manner.

It is not essential that the part $p$ should be screwed into the valve casing $c$ provided it is a good fit at its upper end in the valve casing $c$ as shown in Fig. 3 because air will find its way more readily through the hole $q$ than between the part $p$ and valve casing $c$ and will thus first inflate the chamber A when the hole $q$ is open.

What I claim as my invention is:—

1. In a valve for inflating a duplex air tube for pneumatic tires, the combination of a valve casing, means for fixing said casing in the outer part of the air tube, a disconnectible continuation of said casing, a valve stem and non-return valve carried by said casing, an air inlet head secured in the inner part of said air tube, a rubber tube attached to said air inlet head, an extension of said rubber tube fitting closely at one part the valve casing, and means for positively opening and closing the end of said extension, substantially as set forth.

2. In a valve for inflating a duplex air tube for pneumatic tires, the combination of a valve casing, means for fixing said casing in the outer part of the air tube, a disconnectible continuation of said casing, a valve stem and non-return valve carried by said casing, an air inlet head secured in the inner part of said air tube, a rubber tube attached to said air inlet head, an extension of said rubber tube, a screw thread on said extension, a screw thread in the interior of the valve casing into which such extension is screwed, and means for positively opening and closing the end of said extension, substantially as set forth.

In witness whereof I have hereunto set my hand in presence of two witnesses.

GRACE DE VIGNE.

Witnesses:
  B. J. B. MILLS,
  CLAUDE K. MILLS.